United States Patent
Duan et al.

(10) Patent No.: US 7,313,279 B2
(45) Date of Patent: Dec. 25, 2007

(54) HIERARCHICAL DETERMINATION OF FEATURE RELEVANCY

(75) Inventors: Baofu Duan, Cleveland Heights, OH (US); Zhuo Meng, Broadview Heights, OH (US); Yoh-Han Pao, Cleveland Heights, OH (US)

(73) Assignee: Computer Associates Think, Inc., Islandia, NY (US)

( * ) Notice: Subject to any disclaimer, the term of this patent is extended or adjusted under 35 U.S.C. 154(b) by 782 days.

(21) Appl. No.: 10/615,885

(22) Filed: Jul. 8, 2003

(65) Prior Publication Data

US 2005/0008227 A1    Jan. 13, 2005

(51) Int. Cl.
    *G06K 9/46* (2006.01)
(52) U.S. Cl. .................................... 382/195
(58) Field of Classification Search ............... 382/173, 382/190, 195, 209, 225, 282; 707/4–5
    See application file for complete search history.

(56) References Cited

U.S. PATENT DOCUMENTS

| | | | |
|---|---|---|---|
| 4,193,115 A | 3/1980 | Albus | |
| 4,215,396 A | 7/1980 | Henry et al. | |
| 4,438,497 A | 3/1984 | Willis et al. | |
| 4,649,515 A | 3/1987 | Thompson et al. | |
| 4,663,703 A | 5/1987 | Axelby et al. | |
| 4,670,848 A | 6/1987 | Schramm | |
| 4,740,886 A | 4/1988 | Tanifuji et al. | |
| 4,754,410 A | 6/1988 | Leech et al. | |
| 4,858,147 A | 8/1989 | Conwell | |
| 4,928,484 A | 5/1990 | Peczkowski | |
| 4,972,363 A | 11/1990 | Nguyen et al. | |
| 4,979,126 A | 12/1990 | Pao et al. | |
| 4,994,982 A | 2/1991 | Duranton et al. | |
| 5,023,045 A | 6/1991 | Watanabe et al. | |
| 5,052,043 A | 9/1991 | Gaborski | |
| 5,111,531 A | 5/1992 | Grayson et al. | |
| 5,113,483 A | 5/1992 | Keeler et al. | |
| 5,119,468 A | 6/1992 | Owens | |
| 5,140,523 A | 8/1992 | Frankel et al. | |
| 5,142,612 A | 8/1992 | Skeirik | |
| 5,175,797 A | 12/1992 | Funabashi et al. | |
| 5,247,445 A | 9/1993 | Miyano et al. | |
| 5,311,421 A | 5/1994 | Nomura et al. | |
| 5,335,291 A | 8/1994 | Kramer et al. | |
| 5,349,541 A | 9/1994 | Alexandro et al. | |
| 5,485,390 A | 1/1996 | LeClair et al. | |
| 5,734,796 A | 3/1998 | Pao | |
| 5,848,402 A | 12/1998 | Pao et al. | |
| 6,134,537 A | 10/2000 | Pao et al. | |
| 6,327,550 B1 | 12/2001 | Vinberg et al. | |

(Continued)

FOREIGN PATENT DOCUMENTS

WO    WO 2005/008571    1/2005

OTHER PUBLICATIONS

Tusk, et al "Automated feature selection through relevance feedback", IEEE, pp. 3691-3693, Feb. 2003.*

(Continued)

*Primary Examiner*—Daniel Mariam
(74) *Attorney, Agent, or Firm*—Baker Botts L.L.P.

(57) ABSTRACT

Methods for feature selection based on hierarchical local-region analysis of feature relationships in a data set are provided.

26 Claims, 4 Drawing Sheets

U.S. PATENT DOCUMENTS

| | | | |
|---|---|---|---|
| 6,341,283 B1* | 1/2002 | Yamakawa et al. | 707/5 |
| 6,728,706 B2* | 4/2004 | Aggarwal et al. | 707/5 |
| 6,859,802 B1* | 2/2005 | Rui | 707/5 |
| 6,865,582 B2* | 3/2005 | Obradovic et al. | 707/104.1 |
| 2004/0019574 A1 | 1/2004 | Meng et al. | 706/15 |

OTHER PUBLICATIONS

I. E. Frank; "Modern Nonlinear Regression Methods": Chemometrics and Intelligent Laboratory Systems, vol. 27; pp. 1-19, 1995.

Hwang, et al; "Hierarchical Discriminant Regression"; IEEE Transactions on Pattern Analysis and Machine Intelligence, vol. 22, No. 11, pp. 1277-1293; XP-002302472, Nov. 2000.

Jain, et al; "Feature Selection: Evaluation, Application, and Small Sample Performance"; IEEE Transactions on Pattern Analysis and Machine Intelligence, vol. 19, No. 2; pp. 153-158; XP-002294891, Feb. 1997.

E. Krusinska; "Two Step Semi-Optimal Branch and Bound Algorithm for Feature Selection in Mixed Variable Discrimination"; 1023 Pattern Recognition, vol. 22, No. 4, Head. Hill Hall, Oxford, GB; pp. 455-459; XP-000046518, 1989.

P. M. Narandra et al.; "A Branch and Bound Algorithm for Feature Subset Selection"; IEEE Transactions on Computers, vol. C-26, No. 9; pp. 917-922; XP-0000647423, Sep. 1977.

Communication pursuant to Article 96(2) EPC (Appln. No. 04 777 558.0-1224), Jun. 1, 2006.

PCT Notification of Transmittal of the International Search Report and the Written Opinion of the International Searching Authority, or the Declaration, for International Application No. PCT/US2006/007158, 13 pages, Jul. 10, 2006.

Hall et al.; "Benchmarking Attribute Selection Techniques for Discrete Class Data Mining"; Knowledge and Data Engineering, vol. 15, No. 6; pp. 1437-1447; XP-002387331, Nov. 6, 2003.

P. Perner; "Improving the Accuracy of Decision Tree Induction by Feature Pre-Selection"; Applied Artificial Intelligence, vol. 15, No. 8; pp. 747-760; XP-002387332, 2001.

R. L. DeMantaras; "A Distance-Based Attribute Selection Measure for Decision Tree Induction"; Machine Learning, vol. 6; pp. 81-92; XP-008065823, 1991.

Nov. 11, 2004 International Search Report in connection with International Application No. PCT/US2004/021511 which corresponds to the above-identified application.

Narendra, P.M. et al. (Sep. 1977) "A Branch and Bound Algorithm for Feature Subset Selection", IEEE Transactions On Computers, vol. C-26, No. 9, pp. 917-922.

Krusinska, E. (1989) "Two Step Semi-Optimal Branch And Bound Algorithm For Feature Selection In Mixed Variable Discrimination", Pattern Recognition, vol. 22, No. 4, pp. 455-459.

Frank, I.E. (1995) "Modern nonlinear regression methods", Chemometrics and Intelligent Laboratory Systems, vol. 27, pp. 1-19.

Jain, A. et al. (Feb. 1997) "Feature Selection: Evaluation, Application, and Small Sample Performance", IEEE Transactions on Pattern Analysis and Machine Intelligence, vol. 19, No. 2, pp. 153-158.

Hwang, W-S et al. (Nov. 2000) "Hierarchical Discriminant Regression", IEEE Transactions On Pattern Analysis and Machine Intelligence, vol. 22, No. 11, pp. 1277-1293.

Surajit Chaudhuri, Usama Fayyad and Jeff Bernhardt, "Scalable Classification over SQL Databases", Proceedings of the 15th International Conference on Data Engineering, Mar. 23-26, 1999, Sidney, Australia, pp. 470-479.

Dennis T. Lee, Yoh-Han Pao and Dejan J. Sobajic "Dynamic System Control Using Neural Networks", pp. 25-30.

Yoh-Han Pao "Neural Net Computing For Patter Recognition" Handbook of Pattern Recognition, and Computer Vision, pp. 125-162 (edited by C.H. Chen, L.F. Pau and P.S.P. Wang).

Bernard Widrow, Narendra K. Gupta, and Sidhartha Maitra (Sep. 1973) "Punish/Reward: Learning With a Critic in Adaptive Threshold Systems", IEEE Trans. Systems, Man and Cybernetics, vol. SMC-3, No. 5, pp. 455-465.

John A. Hartigan, (1975) "Interpretation and Evaluation of Clusters", Clustering Algorithms, pp. 12-14.

Yoh-Han Pao and Dejan J. Sobajic (1987) "Metric Synthesis and Concept Discovery With Connectionist Networks", 1987 IEEE, pp. 390-395.

Bernard Widrow and Rodney Winter (Mar. 1988) "Neural Nets for Adaptive Filtering and Adaptive Pattern Recognition", IEEE Computer, pp. 25-39.

Bernard Widrow, Rodney G. Winter, and Robert A. Baxter (Jul. 1988) "Layered Neural Nets for Pattern Recognition", IEEE Trans. Acoustics, Speech, and Signal Processing, vol. 36, No. 7, pp. 1109-1118.

Yoh-Han Pao, (1989) Adaptive Pattern Recognition and Neural Networks.

Andrew G. Barto (1990) "Connectionist Learning for Control", Neural Networks for Control, pp. 5-58 (edited by W. Thomas Miller, III, Richard S. Sutton and Paul J. Werbos).

R.D. Coyne and A.G. Postmus (1990) "Spatial Applications of Neural Networks in Computer-aided Design", Artificial Intelligence in Engineering, 5(1):9-22.

Kumpati S. Narendra and Kannan Parthasarathy (Mar. 1990) "Identification and Control of Dynamical Systems Using Neural Networks", IEEE Trans. Neural Networks, vol. 1, No. 1, pp. 4-27.

Maryhelen Stevenson, Rodney Winter, and Bernard Widrow (Mar. 1990) "Sensitivity of Feedforward Neural Networks to Weight Errors", IEEE Trans. Neural Networks, vol. 1, No. 1, pp. 71-80.

Esther Levin, Naftali Tishby, and Sara A. Solla (Oct. 1990) "A Statistical Approach to Learning and Generalization in Layered Neural Networks", Proc. IEEE, vol. 78, No. 10, pp. 1568-1574.

Les Atlas, Jerome Connor and Mark Damborg (1991) "Comparisons of Conventional Techniques and Neural Network in Computer-aided Design", Artificial Intelligence in Engineering, 5(1):9-22.

Miodrag Djukanov, Borivoje Babic, Dijan J. Sobajic and Yoh-Han Pao (1991) "Unsupervised/Supervised Learning Concept for 24-Hour Load Forecasting", Artificial Intelligence in Engineering, pp. 819-827.

M.M. Gupta and J. Qi (1991) "Fusion of Fuzzy Logic and Neural Networks with Applications to Decision and Control Problems", Proceedings of the 1991 American Control Conference, pp. 1:30-31.

Jocelyn Sietsma and Robert J. F. Dow (1991) "Creating Artificial Neural Networks That Generalize", Neural Networks, vol. 4, pp. 67-79.

Petros A. Ioannou and Aniruddha Datta (Dec. 1991) "Robust Adaptive Control: A Unified Approach", Proc. IEEE, vol. 79, No. 12, pp. 1736-1768.

S.A. Billings, H.B. Jamaluddin and S. Chen (1992) "Properties of neural networks with applications to modeling non-linear dynamical systems", Int. J. Control, pp. 55(1):193-224.

John Doleac, Jeff Getchius, Judy Franklin and Chuck Anderson (1992) "Nadaline Connectionist Learning vs. Linear Regression at a Lamp Manufacturing Plant", Proceedings of The First IEEE Conference on Control Applications, pp. 552-558.

William Finnoff, Ferdinand Hergert, and Hans Georg Zimmerman (1993) "Improving Model Selection by Nonconvergent Methods", Neural Networks, vol. 6, pp. 771-783.

Andreas Ikonomopoulos, Lefteri H. Tsoukalas and Robert E. Uhrig (1993) "A Hybrid Neural Networ-Fuzzy Arithmetic Methodology For Performing Virtual Measurements in a Complex System", Proceedings of the Thirty-Sixth Power Instrumentation Symposium, pp. 205-212.

Michael Nikolaou (1993) "Neural Network Modeling of Nonlinear Dynamical Systems", Proceedings of the 1993 American Control Conference, pp. 1460-1464.

Stevan V. Odri, Dusan P. Petrovacki, and Gorana A. Krstonosic (1993) "Evolutional Development of a Multilevel Neural Network", Neural Networks, vol. 6, pp. 583-595.

Yoh-Han Pao and Gwang-Hoon Park (1993) "Neural-Net Computing for Machine Recognition of Handwritten English Language text", Fundamentals of Handwriting Recognition, pp. 335-351.

Mujeeb M. Ahmed (1994) "An Integrated Approach to Distributed Intelligent Control", Proceeding of the Thirty-Seventh Power Instrumentation Symposium, pp. 1-15.

Timothy J. Graettinger, Naveen V. Bhat and Jeffrey S. Buck (1994) Adaptive Control with NeuCOP, the Neural Control and Optimization Package, *IEEE*, pp. 2389-2393.

Yoh-Han Pao (1994) "Processing Monitoring and Optimization for Power Systems Applications", *IEEE International Conference on Neural Networks*, pp. 3697-3702.

Percy P.C Yip and Yoh-Han Pao (1994) "A Guided Evolutionary Computation Technique as Function Optimizer", *Proceedings of First IEEE Conference on Evolutionary Computation*, pp. 628-633.

Stuart J. Russell and Peter Norvig, (1995) "Learning From Observations", *Artificial Intelligence: A Modern Approach*, pp. 525-562.

Mattias Nyberg and Yoh-Han Pao (1995) "Automatic Optimal Design of Fuzzy Systems Based on Universal Approximation and Evolutionary Programming", *Fuzzy Logic And Intelligent Systems*, pp. 311-366 (edited by H.L. Hua and M. Gupta).

Percy P.C. Yip and Yoh-Han Pao (1995) "Combinatorial Optimization with Use of Guided Evolutionary Simulated Annealing", *IEEE Transaction on Neural Networks*, 6(2):290-295.

Yoh-Han Pao (1996) "Dimension Reduction Feature Extraction and Interpretation of Data With Network Computing", *International Journal of Patter Recognition and Artificial Intelligence*, pp. 10(5)521-253.

Yoh-Han Pao and Zhou Meng (1996) "A Perspective on Funtional-Link Computing, Dimension Reduction and Signal/Image Understanding", *Proceedings of 1996 IEEE Signal Processing Society Workshop*, pp. 213-222.

Michael J. A. Berry and Gordon Linoff, (1997) *Data Mining Techniques For Marketing, Sales and Customer Support*, Chapters 2, 5 and 12, pp. 17-35, 63-93 and 243-285.

Floriana Esposito, Donato Malerba and Giovanni Semeraro, (May 1997) "A Comparative Analysis Of Methods For Pruning Decision Trees", *IEEE Transaction on Pattern Analysis and Machine Intelligence*, 19(5):476-491.

Byung Hwan Jun, Chang Soo Kim, Hong-Yeop Song and Jaihie Kim, (Dec. 1997) "A New Criterion in Selection and Discretization of Attributes for the Generation of Decision Trees", *IEEE Transaction on Pattern Analysis and Machine Intelligence*, 19(12):1371-1375.

Yoh-Han Pao and Chang-Yun Shen (1997) "Visualization of Pattern Data Through Learning of Non-linear Variance-Conserving Dimension-Reduction Mapping", *Pattern Recognition*, 30(10):1705-1717.

Paul S. Bradley, Usama M. Fayyad and Cory A. Reina, (Jun. 1998) "Scaling Clustering Algorithms to Large Databases", Proc. 4$^{th}$ Int'l Conf. Knowledge Discovery & Data Mining, pp. 9-15.

Yoh-Han Pao and Zhou Meng (1998) "Visualization and the understanding of multidimensional data", *Engineering Applications of Artificial Intelligence*, 11:659-667.

Sholom M. Weiss and Nitin Indurkhya (1998) *Predictive Data Mining: A Practical Guide*, pp. 119-123 and 136-142.

Michael J. A. Berry and Gordon Linoff, (2000) *Mastering Data Mining The Art and Science of Customer Relationship Management*, pp. 59-64 and 111-121.

Timo Koskela (2000) "Decision Trees", http://www.hut.fi/~timoko/treeprogs.html.

* cited by examiner

| Training algorithm | 2 inputs | | | | 10 inputs | | | |
|---|---|---|---|---|---|---|---|---|
| | time | DOF | MSE | ANOVA $R^2$ | time | DOF | MSE | ANOVA $R^2$ |
| RBF | 1 | 15 | 0.00008 | 99.17 | 2 | 209 | 0.00015 | 98.52 |
| BP | 25 | 12 | 0.00147 | 85.38 | 39 | 36 | 0.00214 | 78.62 |

HIERARCHICAL DETERMINATION OF FEATURE RELEVANCY

TECHNICAL FIELD

This application relates to pattern recognition and data mining. In particular, the application relates to feature analysis for pattern recognition and data mining.

DESCRIPTION OF RELATED ART

Feature selection is of theoretical interest and practical importance in the practice of pattern recognition and data mining. Data objects typically can be described in terms of a number of feature values. The task is to determine what feature or subset of features is to be used as the basis for decision making in classification and for other related data mining tasks. Although objects or data entities can be described in terms of many features, some features may be redundant or irrelevant for specific tasks, and therefore instead may serve primarily as a source of confusion. It is not necessarily true that a larger number of features provides better results in task performance. Inclusion of irrelevant features increases noise and computational complexity. In addition, for any one specific task, different subsets of features might be relevant in different regions of input data space. Therefore, feature selection is a matter of considerable interest and importance in multivariate data analysis.

For example, when a specific behavior or output of a specific system is modeled, it is typically desirable to include only parameters that contribute to the modeled system behavior and not other parameters which contribute to other behaviors of the system but are not particularly relevant to the specific modeled behavior.

In a classification task, a process for identifying relevant features can usually be formalized to specify a criterion for class assignment followed by an evaluation of the ability of the specified criterion to serve as a basis for class separation or for minimizing the degree of overlap between different classes. Features can then be evaluated on a basis of how effective they are when used in combination with the specified criterion.

As a slight variation to the process described above, instead of selecting a set of features for a specific criterion, one can rank the features that contribute to separation of classes. One issue that is often presented is how to search an optimum group of features for a specific criterion, where the number of possible groups of features is combinatorial. Many methods have been proposed involving or based on neural networks, genetic algorithms, fuzzy sets, or hybrids of those methodologies.

However, there is a need for improved methods for feature selection.

SUMMARY

The application provides a method for feature selection based on hierarchical local-region analysis of feature relationships in a data set. In one embodiment, the method includes partitioning hierarchically a data space associated with a data set into a plurality of local regions, using a similarity metric to evaluate for each local region a relationship measure between input features and a selected output feature, and identifying one or more relevant features, by using the similarity metric for each local region.

According to another embodiment, a method for feature selection based on hierarchical local-region analysis of feature characteristics in a data set, includes partitioning hierarchically a data space corresponding to a data set into a plurality of local regions, using a relationship measure to evaluate for each local region a correlation between input feature values on the one hand and a selected output on the other hand, and determining a relevancy of a selected feature by performing a weighted sum of the relationship measure for the feature over the plurality of local regions.

Hierarchical local-region analysis is the key to successful identification of relevant features. As it is evident in examples provided below, neither too few nor too many local regions would yield satisfactory results.

BRIEF DESCRIPTION OF THE DRAWINGS

The features of the present application can be more readily understood from the following detailed description with reference to the accompanying drawings wherein.

DETAILED DESCRIPTION

This application provides tools (in the form of methodologies and systems) for identifying relevant features (from a set of available or specified features), for example, through feature ranking and/or selection, for feature analysis. The tools may be embodied in one or more computer programs stored on a computer readable medium and/or transmitted via a computer network or other transmission medium.

Figure 1:
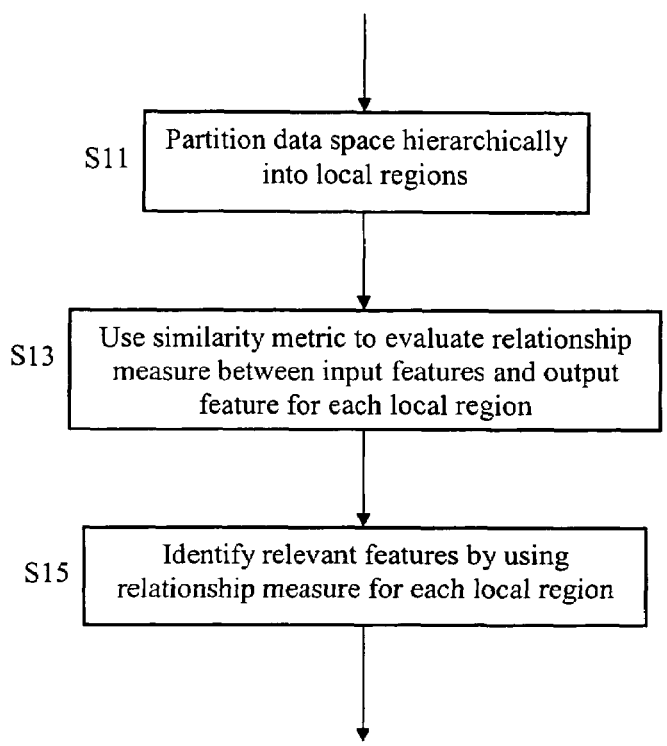
FIG. 1 shows a flow chart of a method, according to one embodiment, for feature selection based on hierarchical local-region analysis of feature characteristics in a data set.

Methods for feature selection based on hierarchical local-region analysis of feature characteristics in a data set are described in this application. A method for feature selection, according to one embodiment, will be described with reference to FIG. 1. A data space associated with a data set is partitioned hierarchically into a plurality of local regions (step S11). A similarity metric is used to evaluate for each local region a relationship measure between input features and a selected output feature (step S13). One or more relevant features is identified by using the relationship measure for each local region (step S15). The method may further include determining a feature relevancy of a selected feature by performing a weighted sum of the relationship measures for the selected feature over the plurality of local regions. The weights for the weighted sum may be based on sizes of the respective local regions.

The partitioning of the data space into the plurality of local regions can be performed by hierarchical clustering of the data set in a plurality of levels. Feature relevancies can be determined for each of the input features based on the relationship measure at each level of the hierarchical clustering, and the relevant features identified based on the feature relevancies.

The method may further include determining for each local region a corresponding subset of relevant features based on the relationship measure for the local region. The subsets of relevant features for respective local regions may be non-identical. The local regions may be nonoverlapping.

The similarity metric may be linear, and may include a projection or distance. The relationship measure may include a correlation or $R^2$.

Figure 2:
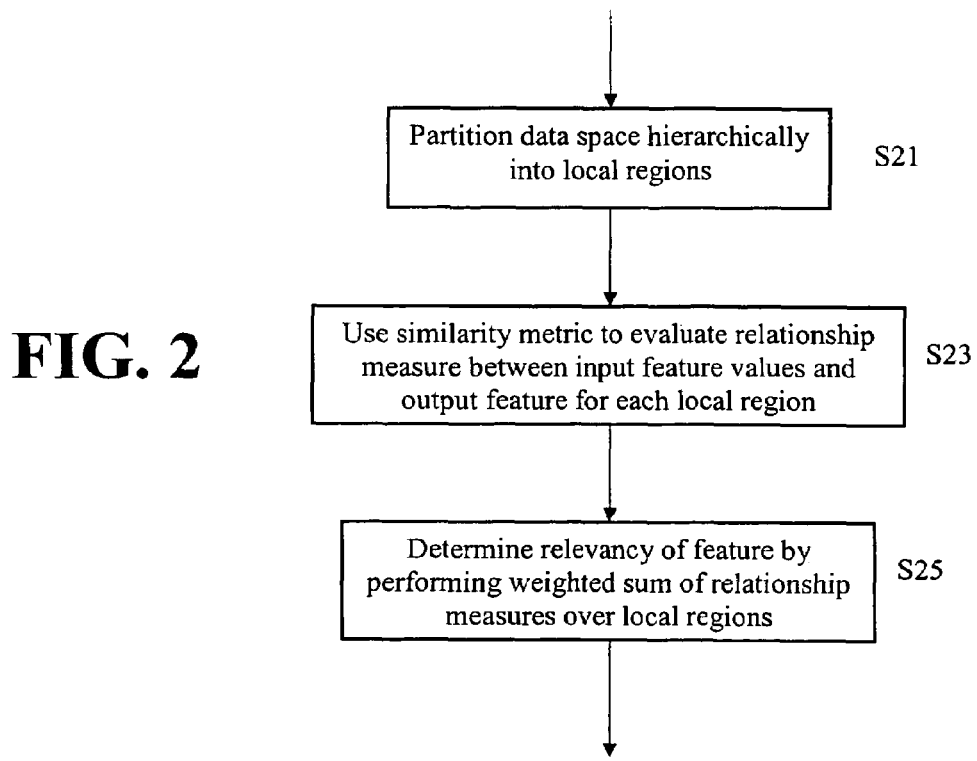
FIG. 2 shows a flow chart of a method for feature selection based on hierarchical local-region analysis of feature characteristics in a data set, according to an alternative embodiment of the present application.

A method for feature selection based on hierarchical local-region analysis of feature characteristics in a data set, according to another embodiment, will be explained with reference to FIG. 2. A data space corresponding to a data set is partitioned hierarchically into a plurality of local regions (step S21). A similarity metric is used to evaluate for each local region a relationship measure between input feature values on the one hand and a selected output on the other hand (step S23). A relevancy of a selected feature is determined by performing a weighted sum of the relationship measures for the feature over the plurality of local regions (step S25). The weights for the weighted sum may be based on sizes of the respective local regions. The method may further comprise ranking the input features according to the corresponding feature relevancies of the input features. The local regions may be nonoverlapping.

The partitioning of the data space may be performed through hierarchical clustering of the data set in a plurality of cluster levels. The method may further include identifying relevant features at each level of the hierarchical clustering and determining corresponding feature-relevancies.

Feature analysis can be motivated by the need to pick the most relevant features from all of the available ones, given a specific dependent feature or quality. This disclosure describes hierarchical determination of feature relevancy (HDFR) which can be applied to feature selection and/or ranking on the basis of relevancy to a task at hand.

For an example of modeling a specific behavior, or output, of a specific system, the selection criterion can be the relevancy of a feature to the specific behavior output. In order to assess relevancy of a feature, one can simply compute the correlation between the feature and the specific behavior output. If a strong correlation exists, the feature is apparently relevant to the specific output. However, although a feature may not show strong correlation over the whole range of data input values, it might nevertheless show strong correlation over different ranges. Such a feature can still be considered relevant and thus selected.

Hierarchical determination of feature relevancy can be used for the task of feature selection based on hierarchical local-region analysis of feature characteristics. Hierarchical clustering may be combined with various linear or nonlinear similarity metrics. In any event, hierarchical clustering can be used to delineate the partitioning of the entire body of input data into non-overlapping local regions.

In each local region, there might be a corresponding subset of features that is relevant according to the metric being used for the task in question. Different regions of input data space may or may not have the same subset of features. In other words, a feature or subset of features might not show strong relevancy to a particular task over the entire range of data but might show strong relevancy over different delineated local regions. Such a feature can still be considered relevant and can be identified for use in the appropriate regions. Region delineation enhances a likelihood that the subsequent feature selection process successfully identifies the relevancies of features for a particular local region.

According to one embodiment in which HDFR is applied to system modeling, hierarchical clustering can be used to partition data space into local regions and a similarity metric is used to evaluate relationship measures between input feature values and system output for entities in each local region. The weighted sum of the relationship measures for a selected feature evaluated over all of the local regions can be used as a measure of the relevancy of the selected feature for a selected task. By applying this technique to a set of features, a subset of relevant features can be identified. For other circumstances, feature relevancy might be evaluated on the basis of maximum similarity. In addition, different subsets of relevant features can be identified for different regions of input data space.

The relevancy data structures can be managed through hierarchical clustering. The relevancies of features in local regions at one level of the hierarchy can be considered together to determine the relevant features for that level. The relevant features for the problem at large can be derived from a consideration of the evaluations over the local regions at each level of the hierarchy. The hierarchical approach increases a probability of discovering subtle relevancies by avoiding accidental cancellation of correlation and also helps to prune accidental relationships.

For illustration purposes, additional exemplary embodiments are described below.

An exemplary embodiment of hierarchical determination of feature relevancy which utilizes a linear metric is described below. This exemplary embodiment may be applied to discover feature relevancies of numeric data with the assumption that the input features have a certain numeric relationship with the output. Hierarchical clustering is used to partition and transform data into groups of points in hyper-spherical local regions. A linear metric (for example, R-squared) is used to evaluate the relationship between input features and the output. R-squared values over all of the local regions are summarized as the relevancies of input features.

The embodiment can be analogized to an example of approximating scalar function defined in n-dimensional space. Given a function $y=f(X)$, where $X=(x_1, x_2, \ldots, x_n)^T$ is the n-dimensional input variable and y is the output scalar variable, if the function f( ) is differentiable at point $X_0$, (i.e., the first partial derivative functions $f^{(1)}(X)=(\partial f/\partial x_1(X), \partial f/\partial x_2(X), \ldots, \partial f/\partial x_n$ exists), then a tangent function $L(X)=f(X_0)+f^{(1)}(X_0)(X-X_0)$ is the linear approximation of $f(X)$ in the neighbor region of $X_0$. The approximation error can be as small as desired if the neighbor region is small enough. For a particular system, the piecewise linear approximation method partitions the system data space into many small regions and builds a linear approximation model in each local region. Each localized linear approximation model is valid only in its corresponding local region and the linear models together serve as a linear approximation model for the system.

An exemplary embodiment of hierarchical determination of feature relevancy which adapts the piecewise linear approximation technique, rather than building a very accurate linear approximation for the problem, can evaluate the correlations between input features and the output feature in each of the local regions based on the assumption that the system can be linearly approximated in the local regions. After the correlations are evaluated, a linear metric can be used to evaluate the similarity between input feature values and the system output for entities in each local region.

Figure 3:
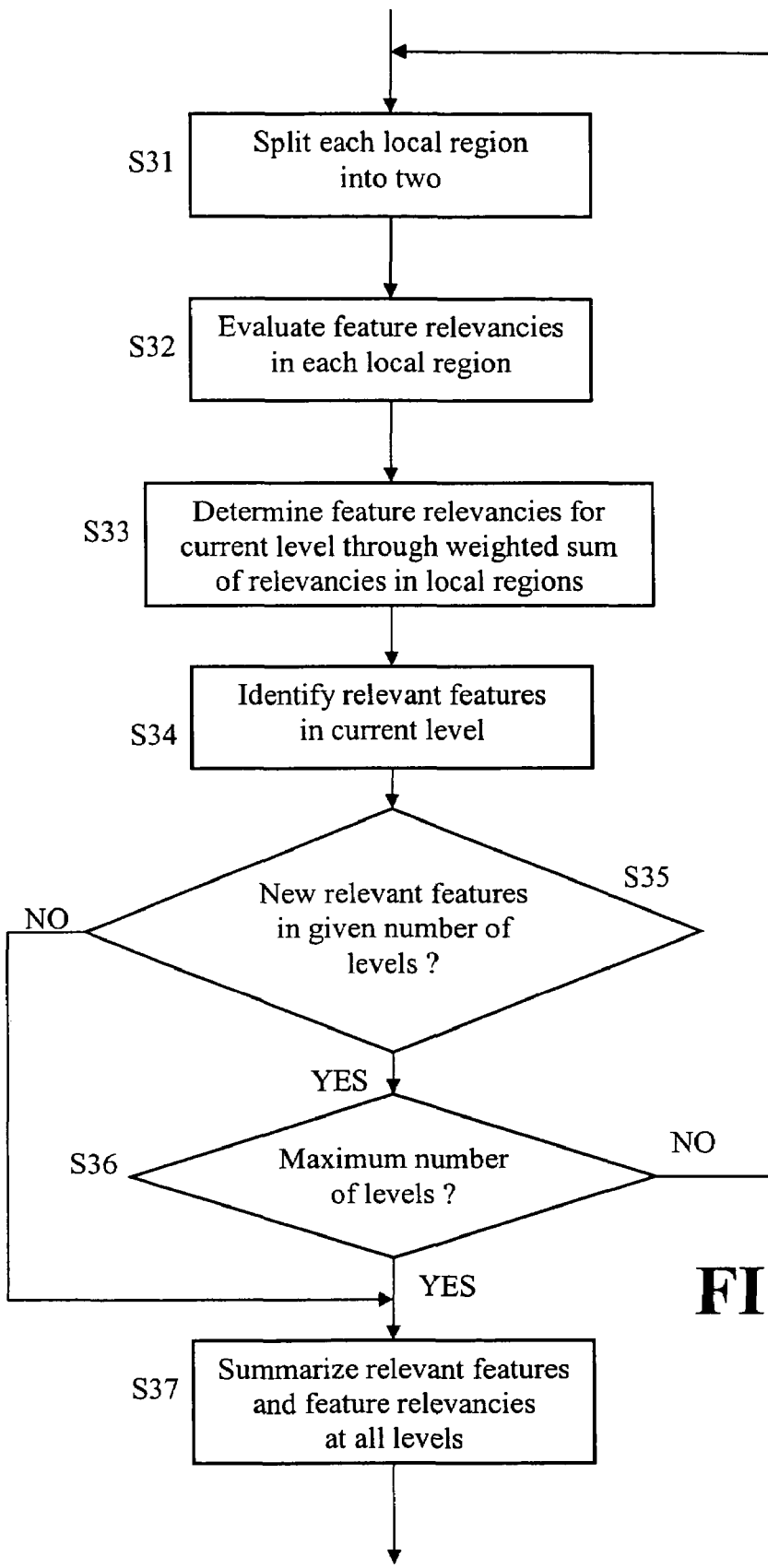
FIG. 3 shows a flow chart of an exemplary embodiment of a method for hierarchical determination of feature relevancy.

A hierarchical clustering technique can be used to partition a data space into local regions. One embodiment is explained with reference to FIG. 3. The data space is partitioned initially into two regions (step S31). For each of the regions in the present level of the hierarchy, feature relevancies are evaluated based on samples in the region (step S32). The feature relevancy of a feature can be measured by the R-squared value between the input feature and the output. Feature relevancies in two local regions are weighted based on the size of the local regions and then summed together (i.e. a weighted sum) as the feature relevancies in the present level (step S33). The feature relevancies in the level are used to identify relevant features which have significantly larger relevancies than the others (step S34). If no new relevant features can be identified for a certain number of levels (step S35, "NO") or a specified maximum number of levels is reached (step S36, "YES"), the feature relevancies can be summarized at all of the levels and a list of relevant features and their relevancies provided (step S37). The local regions in the current level are split further for the next level (step S31), until no new relevant features can be identified for a specified or predetermined number of iterations or a specified maximum number of levels is reached.

The performance of hierarchical determination of feature relevancy is examined and explained below with two examples. One example is the extended parity-2 problem and the other is the extended parity-5 problem. The extended parity-2 and parity-5 problems are derived from the well-known parity-2 and parity-5 problems, but extended to use inputs and output of continuous values. Some random noise inputs are also added for determining whether HDFR can identify the relevant inputs from the noise inputs. The extended parity-5 problem is a more complex task and is used for comparison with the extended parity-2 problem.

The parity-2 problem is a well-known problem. In this problem, the output is the mod-2 sum of two binary input features. The partity-2 problem is extended by using continuous inputs and output. The following nonlinear equation can be used to simulate the problem:

$$y = x_1 + x_2 - 2 \ast x_1 \ast x_2$$

where $x_1$, $x_2$ and $y \in [0, 1]$.

Figure 4:
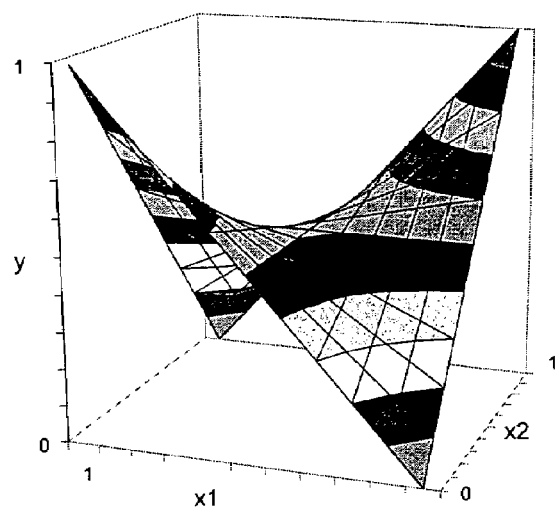
FIG. 4 shows a three-dimensional plot of an extended parity-2 problem.

A 3-D plot of the above equation is shown in FIG. 4. For testing purpose, 8 random input features, $x_3$ to $x_{10}$, are added as noise and 500 samples are randomly generated. The task is to identify the relevant features, $x_1$ and $x_2$, from the noise features, $X_3$ to $x_{10}$.

Figure 5:
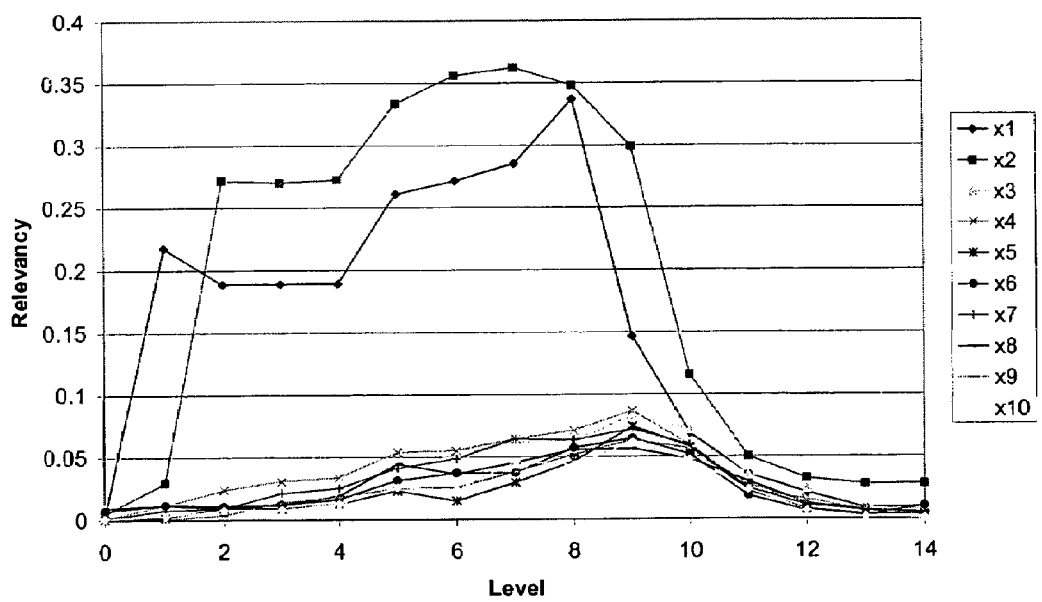
FIG. 5 shows a plot which demonstrates feature relevancies at different levels for the extended parity-2 problem.

HDFR was used to partition the extended parity-2 data space into as many levels as possible and evaluate the relevancy values of the input features at each level. FIG. 5 shows how the feature relevancies vary at different levels. In level 0 (i.e., the original data space), $x_1$ and $x_2$ are not significantly different from other noise features $X_3$ to $x_{10}$. In level 1, $x_1$ is identifies as a relevant feature. In level 2 (or further), both $x_1$ and $x_2$ are identified as relevant features. One interesting thing is that in level 10 and beyond, the relevancies of $x_1$ and $x_2$ are again not significantly different from other noise features $x_3$ to $x_{10}$. This is because of the limited number of samples. When the level goes higher, the number of samples in each local region becomes smaller. When the number of samples in a region is too small, the collection of samples in the region does not contain enough information to differentiate the relevant features from the noise features.

With use of neural net modeling technology, one might hypothesize that it is possible to feed all of the data to a neural net and see whether the model yields any sensible result. However, such practice is likely to yield disappointing results (even though neural net generally is an effective modeling tool). As with any modeling technique, one frequently faces the problem of "the curse of dimensionality." This problem, stated simply, is that an exponential increase of the number of observations is needed in order to achieve the same level of detail for adding extra number of features. While neural nets may be better at coping with higher dimensions, trimming out irrelevant features typically yields much better results than adding more observations.

Figures 6, 7:
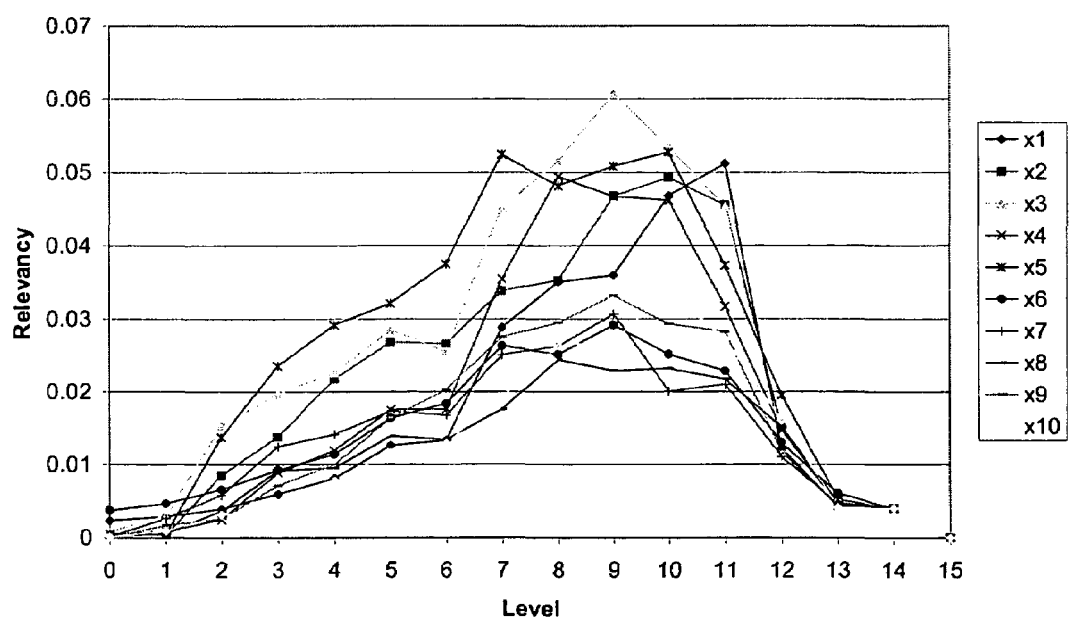
FIG. 6 shows performance of neural net modeling without and with noise features.
FIG. 7 shows a plot which demonstrates feature relevancies at different levels for the extended parity-5 problem.

Two neural net models, one with all of the 10 input features (i.e. including the noise features) and the other with only the 2 relevant input features (i.e. $x_1$ and $x_2$), were utilized to demonstrate that use of only relevant features improves the quality of modeling. For comparison, two learning technique are used to build the neural net models, one being the traditional backpropagation (BP) learning technique using one hidden layer and three hidden nodes in the hidden layer net. The other uses radial basis functions net. FIG. 6 presents the results of the modeling. The values of four performance parameters are shown in FIG. 6, including the time expended to train the model (in seconds), degree of freedom (DOF) [which measures the complexity of the neural net model], mean squared error (MSE) for the training data set and ANOVA R-squared which measures how well the prediction of the neural net model matches the true output. The results show that the neural net models trained with the 2 relevant input features are superior to the neural net models trained with the 10 input features in all of the four performance parameters.

Similar to the parity-2 problem but much more complex, the parity-5 problem has five input features. The output is the mod-2 sum of the five input features. The parity-5 problem also is extended by using continuous inputs and output. The five input features are $x_1$ to $x_5$. Also 5 random noise features, $x_6$ to $x_{10}$, are added and 1000 samples are randomly generated. The task is to identify the relevant features, $x_1$ to $x_5$, from the noise features, $x_6$ to $x_{10}$.

FIG. 7 shows the feature relevancies values at different levels. As can be seen in FIG. 7, the extended parity-5 problem is actually more complex than the extended parity-2 problem. Only $X_3$ and $x_5$ can be selected out in level 2. The process further selects $x_2$ in level 4 and $x_4$ in level 8. It is noted that $x_1$ is not selected out until level 10. Noise features $x_6$ to $x_{10}$ are identified as irrelevant features. In level 12 and beyond, the relevancies of $x_1$ to $x_5$ are not significantly different from noise features $x_6$ to $x_{10}$.

This disclosure describes hierarchical determination of feature relevancy, which can be used to solve the task of feature selection based on hierarchical local-region analysis of feature characteristics. Hierarchical determination of feature relevancy is straightforward and much more efficient as compared with feature selection techniques based on optimization search. HDFR is also very effective due to the hierarchical local region delineation. In addition, HDFR is scalable to handle a very large number of input features.

Some examples are discussed herein to show that HDFR is very effective for identifying relevant features which have subtle nonlinear relationship to the output even though the input features may not be correlated to the output in the whole data range. Although the exemplary embodiments of hierarchical determination of feature relevancy presented in this disclosure are adapted for determining feature relevancies for problems with numeric relationship, other implementations of HDFR can follow a similar process to solve problems with complex relationship, such as categorical and rule-based relationship. In such cases, the appropriate region delineation methods and similarity metrics can be used with HDFR.

Hierarchical determination of feature relevancy can be used to identify relevant features for a specific outcome. For example, HDFR can be applied in process (or system) monitoring, such as to identify relevant features which would trigger a need for adjustments to setpoints of the process or system, for example, when (or ideally before) a problem arises in the process or system, or adjustments would facilitate a desired process output. For the exemplary case of modeling a system, the user can create a leaner and better performing model of a system by removing irrelevant features.

In addition, HDFR can be applied to a data set of historical samples of viral behavior in an information technology (IT) system to extract relevant features. The extracted features can be the basis for rules added to a rule-based security monitor which would, for example, trigger a security alert if the features are detected in the system when the monitor is deployed on-line.

As another example, HDFR can be applied to a consumer profile data set to extract relevant features from patterns in the data set which are associated with specific buying tendencies, or historical stock market data to determine relevant features in a bull market or bear market.

The exemplary embodiments described above are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

As another example, an alternative technique other than hierarchical clustering may be used to generate the hierarchical partition of regions. In addition, other relevancy metrics may be used instead of $R^2$.

What is claimed is:

1. A method for feature selection based on hierarchical local-region analysis of feature characteristics in a data set, comprising:
   partitioning a data space associated with a data set into a hierarchy of pluralities of local regions;
   evaluating a relationship measure for each local region using a metric based on similarity between input features and a selected output; and
   identifying one or more relevant features, by using the relationship measure for each local region.

2. The method of claim 1 further comprising:
   determining a feature relevancy of a selected feature by performing a weighted sum of the relationship measures for the selected feature over the plurality of local regions.

3. The method of claim 2, wherein weights for the weighted sum are based on sizes of the respective local regions.

4. The method of claim 1, wherein the partitioning of the data space into the hierarchy of pluralities of local regions is performed by hierarchical clustering of the data set in a plurality of levels.

5. The method of claim 4, wherein feature relevancies are determined for each of the input features based on the relationship measures at each level of the hierarchical clustering and the relevant features are identified based on the feature relevancies.

6. The method of claim 1 further comprising:
   determining for each local region a corresponding subset of relevant features based on the relationship measures for the local region.

7. The method of claim 6, wherein the subsets of relevant features for respective local regions are non-identical.

8. The method of claim 1, wherein the local regions are nonoverlapping.

9. The method of claim 1, wherein the metric is linear.

10. The method of claim 1, wherein the metric includes a projection or distance.

11. The method of claim 1, wherein the relationship measure includes a correlation.

12. The method of claim 1, wherein the relationship measure includes an R-squared value.

13. A computer system, comprising:
   a processor; and
   a program storage device readable by the computer system, tangibly embodying a program of instructions executable by the processor to:
   partition a data space associated with a data set into a hierarchy of pluralities of local regions;
   evaluate a relationship measure for each local region using a metric based on similarity between input features and a selected output; and
   identify one or more relevant features, by using the relationship measure for each local region.

14. A program storage device readable by a machine, tangibly embodying a program of instructions executable by the machine to:
   partition a data space associated with a data set into a hierarchy of pluralities of local regions;
   evaluate a relationship measure for each local region using a metric based on similarity between input features and a selected output; and
   identify one or more relevant features, by using the relationship measure for each local region.

15. A method for feature selection based on hierarchical local-region analysis of feature characteristics in a data set, comprising:
   partitioning a data space corresponding to a data set into a hierarchy of pluralities of local regions;
   evaluating a relationship measure for each local region using a metric based on similarity between input features and a selected output; and
   determining a relevancy of a selected feature by performing a weighted sum of the relationship measures for the feature over the plurality of local regions at appropriate levels.

16. The method of claim 15, wherein the partitioning of the data space is performed through hierarchical clustering of the data set in a plurality of cluster levels.

17. The method of claim 16 further comprising:
   identifying relevant features at each level of the hierarchical clustering and determining corresponding feature relevancies.

18. The method of claim 15, wherein weights for the weighted sum are based on sizes of the respective local regions.

19. The method of claim 15 further comprising:
   ranking the input features according to the corresponding feature relevancies of the input features.

20. The method of claim 15, wherein the local regions are nonoverlapping.

21. The method of claim 15, wherein the metric is linear.

22. The method of claim 15, wherein the metric includes a projection or distance.

23. The method of claim 15, wherein the relationship measure includes a correlation.

24. The method of claim 15, wherein the relationship measure includes an R-squared value.

25. A computer system, comprising:
   a processor; and
   a program storage device readable by the computer system, tangibly embodying a program of instructions executable by the processor to:
   partition a data space corresponding to a data set into a hierarchy of pluralities of local regions;
   evaluate a relationship measure for each local region using a metric based on similarity between input features and a selected output; and
   determine a relevancy of a selected feature by performing a weighted sum of the relationship measures for the feature over the plurality of local regions at appropriate levels.

26. A program storage device readable by a machine, tangibly embodying a program of instructions executable by the machine to:
   partition a data space corresponding to a data set into a hierarchy of pluralities of local regions;
   evaluate a relationship measure for each local region using a metric based on similarity between input features and a selected output; and
   determine a relevancy of a selected feature by performing a weighted sum of the relationship measures for the feature over the plurality of local regions at appropriate levels.

* * * * *